United States Patent (10) Patent No.: US 6,185,737 B1
Northcutt et al. (45) Date of Patent: *Feb. 6, 2001

(54) METHOD AND APPARATUS FOR PROVIDING MULTI MEDIA NETWORK INTERFACE

(75) Inventors: J. Duane Northcutt, Menlo Park; James G. Hanko, Redwood City; Alan T. Ruberg, Foster City; Gerard A. Wall, San Jose; Lawrence L. Butcher, Mountain View, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/108,062

(22) Filed: Jun. 30, 1998

(51) Int. Cl.[7] .................................................. H04N 7/173
(52) U.S. Cl. ........................................... 725/110; 725/143
(58) Field of Search ..................................... 345/327, 328; 455/4.1, 4.2, 3.2; 348/6, 12, 13; 709/217–219; 370/487

(56) References Cited

U.S. PATENT DOCUMENTS

| 5,265,180 | 11/1993 | Golin . | |
|---|---|---|---|
| 5,561,670 | * 10/1996 | Hoffert et al. | 370/94.1 |
| 5,625,416 | * 4/1997 | Tseng et al. | 348/6 |
| 5,642,151 | * 6/1997 | Nusbickel et al. | 348/6 |
| 5,821,986 | * 10/1998 | Yuan et al. | 348/15 |
| 5,831,666 | * 11/1998 | Palmer et al. | 348/15 |
| 5,894,512 | * 4/1999 | Zenner | 348/16 |
| 5,905,521 | * 5/1999 | Gatto et al. | 348/6 |
| 5,940,387 | * 8/1999 | Humpleman | 370/352 |
| 5,982,413 | * 11/1999 | Irie et al. | 348/7 |

FOREIGN PATENT DOCUMENTS

| 0 808 048 A2 | 11/1997 | (EP) . |
| 0 817 484 A2 | 1/1998 | (EP) . |
| WO 97/10564 | 3/1997 | (WO) . |

OTHER PUBLICATIONS

Haruhiko Kojima, Yoshiaki Iijima, Hironori Kobayashi, and Tomoyuki Kanekiyo, Visual Communication System In An Apartment House Fiber Optics, 8087 IEEE Transactions on Consumer Electronics 39 (1993) Aug. No. 3, New York, U.S., p. 653–659.

* cited by examiner

*Primary Examiner*—Victor R. Kostak
(74) *Attorney, Agent, or Firm*—The Hecker Law Group

(57) ABSTRACT

The present invention is a media interface unit that couples media input (e.g. cameras, microphones) to a network and can receive media input from a network and provide it to playback devices (e.g. monitors, speakers). The interface unit eliminates the need for a computer system when transmitting and receiving media data to and from the internet and other networks. The unit comprises analog audio and video inputs and outputs on one side, and a computer communications network interface on the other side. By coupling sources/sinks of audio/video to one side and by coupling the other side to a network, it is possible to send and receive audio and video data as though the digital communications network were the same as the cables typically used to transport analog audio and video. The invention functions as a multi-media network appliance.

17 Claims, 7 Drawing Sheets

METHOD AND APPARATUS FOR PROVIDING MULTI MEDIA NETWORK INTERFACE

BACKGROUND OF THE INVENTION

1. Field of the Invention

The present invention relates to a method and apparatus for communication of audio and video information in digital form over a network.

2. Background Art

The internet can be used to transmit video and audio data. Typically this is accomplished by connecting a video camera and microphone to a computer system. The video and audio data is converted to a form that can be transmitted over a network. The computer system is used to make a connection to the internet, and the video and audio data is transmitted onto the internet. A disadvantage of the prior art schemes is the necessity to use a computer system to couple the input devices (camera, microphone) to the internet.

A number of cameras are sold as being particularly suited for connection to a computer system. For example, the "QuickCam" by Connectix is used to capture still and video images that can be manipulated by a computers system. Another product is the "Network Eye" from MicroPlex. Among the disadvantages of prior art camera systems is an inability to operate at a full video frame rate, inability to emit RTP Internet standard protocol streams, lack of support for the use of multicast data transport, and lack of audio.

Prior art camera functionality is accomplished by one or more add-in cards and a personal computer or workstation. This is necessary because hardware is needed for codecs and compression functions and a complete, TCP/IP-network-enabled computer is needed to run the protocols needed for the device to communicate data on the Internet.

A camera from Active Imaging, intended for use in security video applications, uses the MPEG video compression standard and purports to not require a computer system to operate on a network. This camera does not function well in unreliable environments (such as Local Area Networks), and it does not lend itself to multicast transmission. It also involves the use of costly encoding hardware.

SUMMARY OF THE INVENTION

The present invention is a media interface unit that couples media input (e.g. cameras, microphones) to a network and can receive media input from a network and provide it to playback devices (e.g. monitors, speakers). The interface unit eliminates the need for a computer system when transmitting and receiving media data to and from the internet and other networks. The unit comprises analog audio and video inputs and outputs on one side, and a computer communications network interface on the other side. By coupling sources/sinks of audio/video to one side and by coupling the other side to a network, it is possible to send and receive audio and video data as though the digital communications network were the same as the cables typically used to transport analog audio and video. The invention functions as a multi-media network appliance.

DETAILED DESCRIPTION OF THE INVENTION

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Audio and video are intrinsically analog processes which have traditionally been processed and distributed in analog form. By digitizing and encoding audio and video it is possible to capture, transport, process, store and retrieve audio and video information. Computer networking technology (and the growth of the Internet) have made it possible for many individuals to send and receive digital information over a wide area. This invention describes how a small, low-cost device can be created that allows audio and video information to be placed on to, and taken off of, large-scale computer communications networks such as the Internet.

The invention is a self-contained unit that acts as a full network citizen, abiding by the conventions and operating with the standard protocols that define a host device on an Intranet or on the Internet. The invention connects to a source of power and then directly to the network and in one embodiment has no switches, jumpers, or external displays. The invention plugs directly into the network.

This interface unit of the invention can take on any one of three configurations—i.e., input, output, and input/output. In the input configuration, this invention takes analog audio and video signals in on one side of the unit and emits digital audio and video streams out the other side in standard Internet protocol formats. The output mode receives digital audio and video in Internet standard protocol and generates analog audio and video out the other side. In the input/output mode the device can both take analog audio/video inputs and put them on the network, as well as taking digital audio/video streams from the network and put them out as analog signals.

Figure 1:
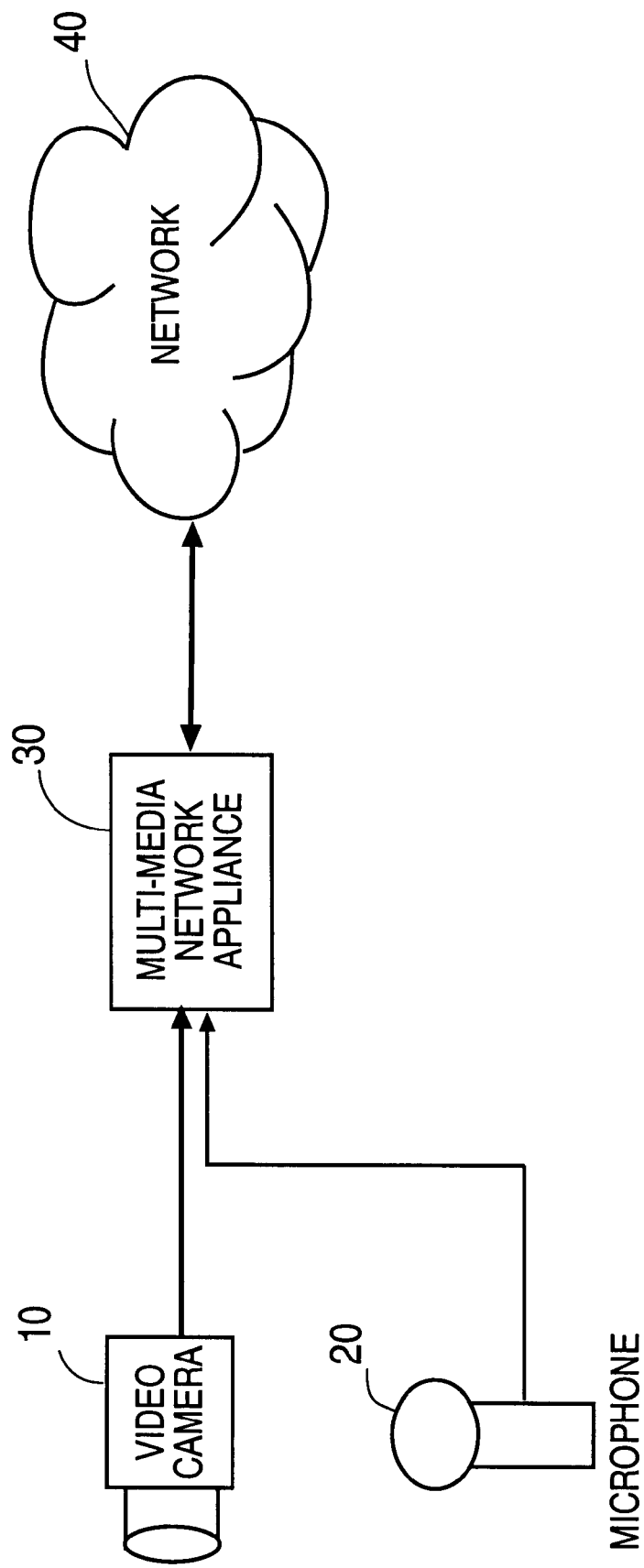
FIG. 1 illustrates an input configuration of the multi-media network appliance.
Figure 2:
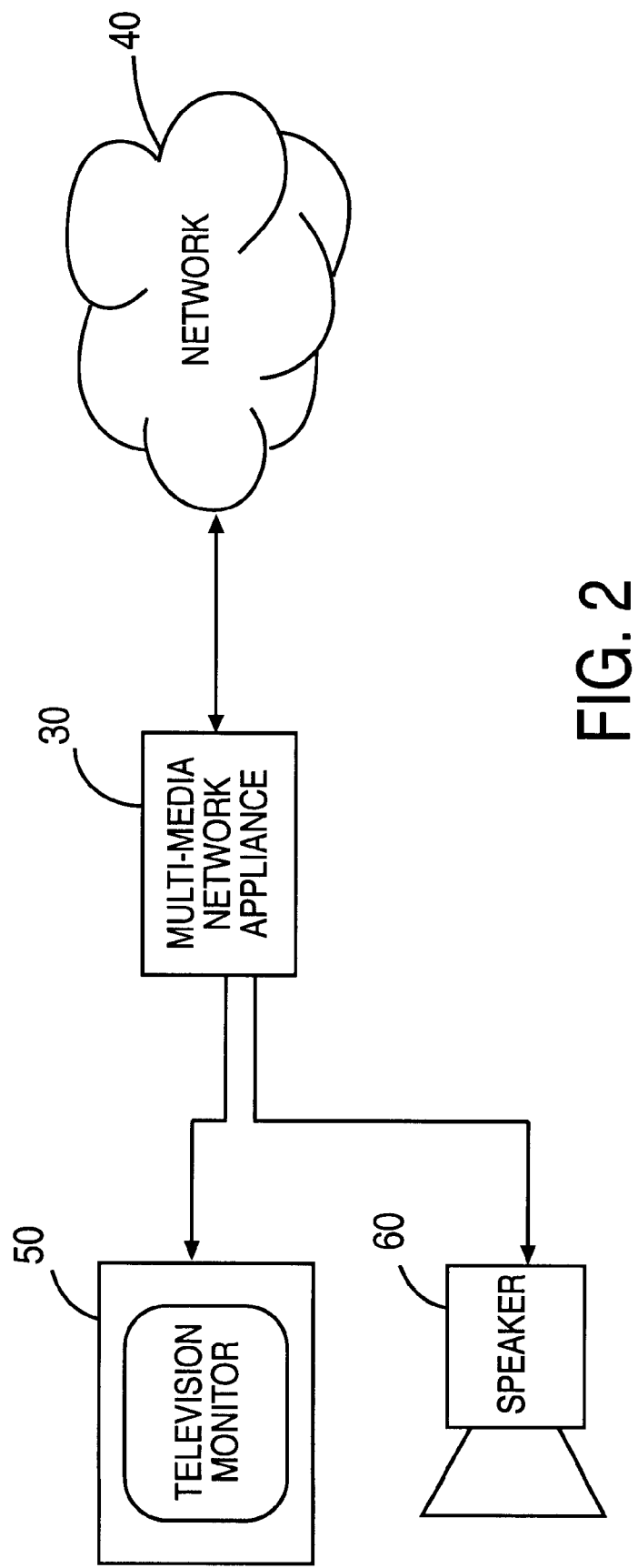
FIG. 2 illustrates an output configuration of the multi-media network appliance.
Figure 3:
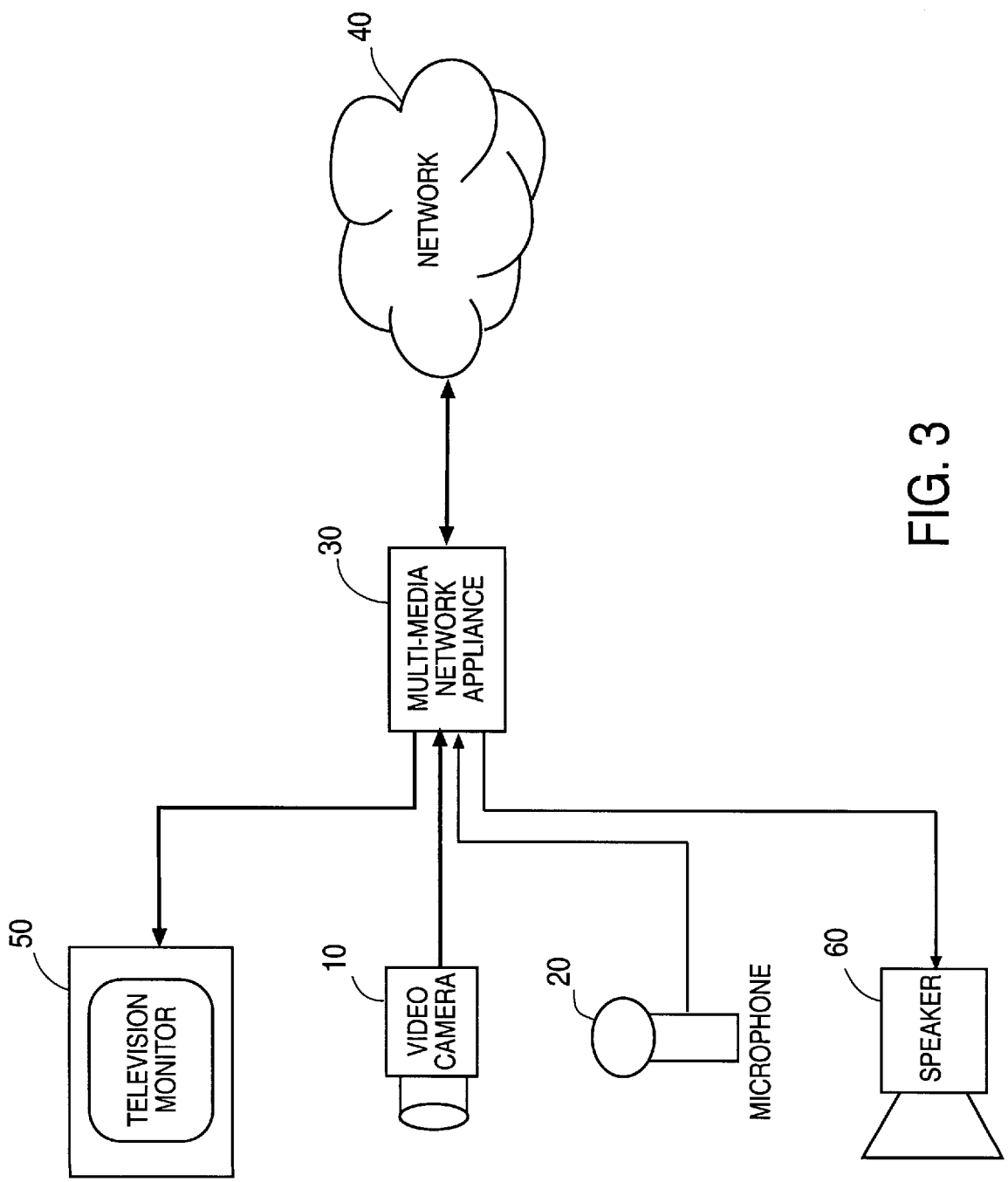
FIG. 3 illustrates an input/output configuration of the multi-media network appliance.

FIG. 1, FIG. 2, and FIG. 3 provide a block-level schematic illustration of the invention in each of its three modes of operation—i.e., input, output, and input/output respectively. In each of these diagrams the invention connects to a computer communications network on one side and to analog audio/video equipment on the other. Other than power, there are no additional connections required than those shown in the diagrams.

Referring to FIG. 1, the interface unit of the present invention, identified as a multi-media network appliance 30, is coupled on one side to network 40. Network 40 may be the Internet or any LAN, WAN, intranet, or other network. Appliance 30 receives data from a video camera 10 or a microphone 20 and provides it to the network 40.

In FIG. 2 the appliance 30 receives media data from network 40 and provides it to monitor 50 and speaker 60.

FIG. 3 illustrates the appliance 30 in input/output mode where the appliance can receive data from video camera 10 and microphone 20 and provide it to network 40, or receive data from network 40 and provide it to monitor 50 and speaker 60.

Figure 4:
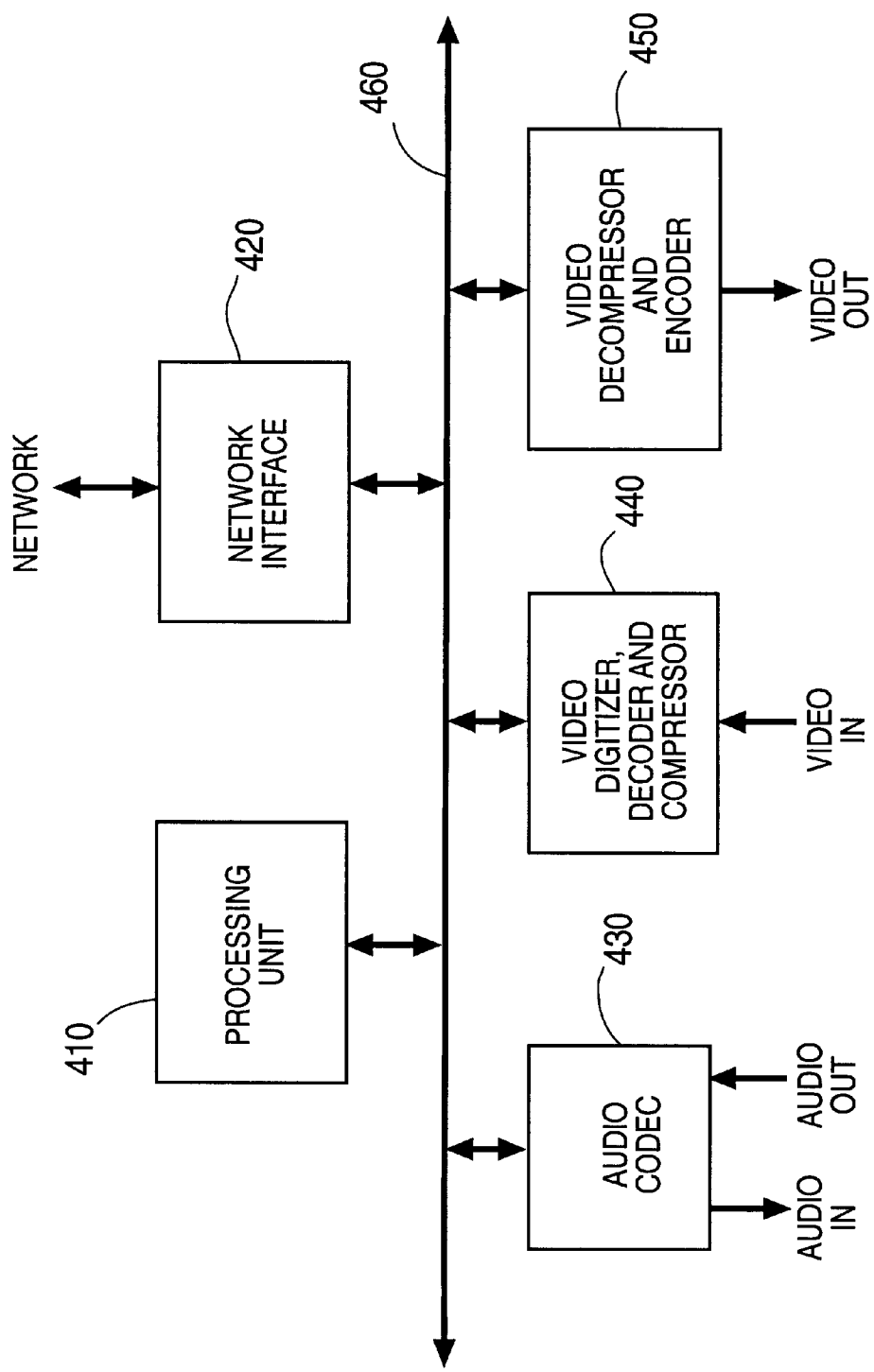
FIG. 4 illustrates components of the multi-media network appliance.

FIG. 4 illustrates the functional components of the invention of the appliance 30 of FIGS. 1–3. The invention includes a processing unit 410, network interface 420, audio codec 430, video digitizer, decoder, and compressor 440, and video decompressor and encoder 450. These components communicate with each other over bus 460.

The processing unit 410 executes a program that controls any attached peripheral devices. The device connects to the network via a network interface unit 420, which handles the transfer of information between the specific type of physical communications network chosen (e.g., Ethernet, Token Ring, etc.) and the processing units associated memory. For example, when data is ready to be sent onto the network, the processing unit 410 creates the necessary network protocol encapsulation for a packet full of the data, and then hands the packet to the network interface 420 which arbitrates for access to the network and ensures that the packet has been sent.

Similarly, when a packet of information is sent to the device, the network interface 420 receives the packet off of the network and informs the processing unit 410 of the packet's arrival. It is then the responsibility of the processing unit 410 to retrieve the packet and interpret its contents.

Each device also has a set of functional units known as codecs (which stands for "coder/decoder"). In particular, this invention includes an audio codec 430 which both digitizes incoming analog audio into digital streams and converts outgoing digital audio streams into analog audio output signals. While the audio input and output functions are combined into a single unit, separate functional units are provided for the video input and video output functions in one embodiment of the invention. One unit 440 digitizes and decodes incoming analog video signals, and compresses the video data, readying it for transfer over the network. Another unit 450 performs the logical inverse of this function by taking compressed video data from the network, decompressing it and encoding and converting it into composite analog format.

Figure 5:
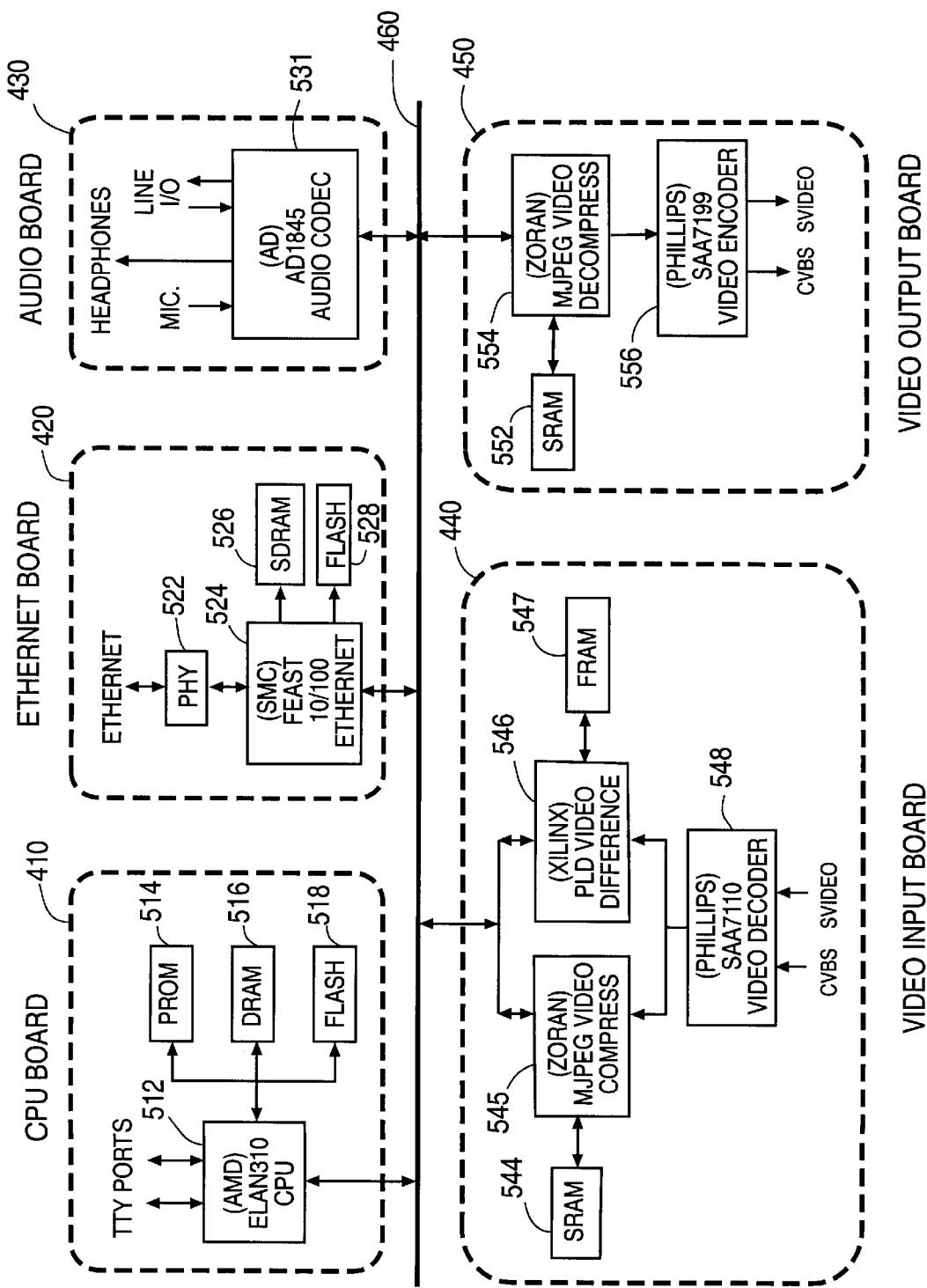
FIG. 5 illustrates an embodiment of a multi-media network appliance.

FIG. 5 provides a more detailed schematic diagram of the embodiment of the device whose partitioning is shown in FIG. 4. The processing unit 410 consists of a processor 512 and its associated memories, including PROM 514 for the boot code, DRAM 516 for the program execution, and Flash memory 518 for local program storage.

The network interface 420 (in this embodiment an Ethernet board) includes the 10 Mbps or 100 Mbps Ethernet controller 524, along with a static RAM 526 for buffering packets, Flash memory 528 for network configuration parameters, and physical network interface component 522.

In the Ethernet version of input configuration, the incoming analog audio and video is digitized and compressed, then blocks of samples are encapsulated in RTP packets, which are then further encapsulated into UDP, IP, and then Ethernet packets for transmission on the network. IETF RFC 1889 and RFC 2035 define how this encapsulation is done and explains how the control channel is maintained by way of packets sent using the RTCP protocol. The RTCP protocol is used to describe the source of associated RTP data streams, provides information necessary to synchronize sets of data streams, and provides a means of exchanging performance information among sets of transmitters and receivers in a (potentially) multicast environment. The output configuration of the invention operates in essentially the same manner, but in reverse—it takes in encapsulated RTP packets, strips the protocol encapsulation, ensures the validity of the received data, decompresses the data, synchronizes it with other streams, and converts it for presentation in analog form.

Referring again to FIG. 5, the audio codec board 430 consists of a single-chip audio encoder/decoder 531. The codec 531 can be coupled to line I/O, headphone or speaker output, and microphone input.

The video input board 440 is composed of a video digitizer and decoder 548 which generates a digital video stream. This stream is passed to both the video compression unit 545 and the video differencing hardware 546. On each frame's completion, video difference information can be read by the processor 512 from the video differencer 546 and a decision can be made whether to update the reference frame in the difference unit's field RAM 547, and whether the compressed data from incoming frame should be read out of the compressor's static RAM 544.

One feature in this invention is the use of a newly created technique for reducing the output data rate called "gated compression." This technique is the subject of pending patent application Ser. No. 09/108,066 filed on Jun. 30, 1998, entitled "Method and Apparatus for the Detection of Motion in Video," assigned to the assignee of the present invention and incorporated herein by reference. With this technique, a mechanism is used to determine if a threshold amount of difference exists between an incoming video frame and a chosen reference frame of video. When no threshold difference exists, then the compressed video stream is "gated" off. Otherwise, the stream flows as normal. In this way, additional degrees of video compression can be achieved at low cost, and in a manner that is compatible with existing standard compression formats. The method is implemented in the video difference block 546.

The gating technique can be used in conjunction with any standard video compression technique to achieve higher effective compression ratios. In effect, gated compression allows the invention to be nontransmitting when it is given an unchanging video input, and then transmit at full rate when time-varying video images are presented. In a security video application the use of gated compression delivers approximately a factor of 100 compression in addition to that given by a native compression method (i.e., with MJPEG compression of 50:1, the use of gated compression can yield an effective compression ration of 5000:1).

Gated compression is also effective with broadcast television. In cases where 30 frame per second video has been converted from 24 frame per second film, a technique called "3-2 pull-down" is used. This duplicates one 10 frame two additional times followed by the display of the next frame, which is then duplicated once (resulting in pattern: AAAB-BCCCDD . . . ). When this video is presented to this invention, the gated compression mechanism removes the redundant frames and achieves an additional compression factor of 60%, with no loss in video quality (as all repeated frames are simply redisplays of the first frame).

The behavior of the device using gated compression can be valuable when the invention coexists with computers on a local area network. If these devices are being used as security video monitors, then the majority of the time they are seeing a similar scene, therefore the devices are silent (i.e., they will not generate network traffic that might interfere with the other uses of the network). When a significant event occurs, the devices can transmit at full frame rate, allowing the capture of highly detailed and complete video sequences, then return to their quiescent state when the event is over. This results in bursty traffic from the devices, alternately transmitting at full rate and being silent. It is possible with this invention to set parameters to define exactly how sensitive to differences in video images the device is to be. It is also possible to set the gating mechanism's parameters such that the device does not perform any gating at all, but simply passes all the video data through to the network.

Referring again to FIG. 4, the video output board 450 contains a video decompression unit 554, its associated static RAM 552 (for buffering the decompressed frame) and a video encoder chip 556 which converts the decompressed video stream into analog (NTSC/PAL) video.

Another mechanism which is used in this device is a rate limiter. This mechanism is used to ensure that the effective data rate of the device does not exceed a given amount over some period of time. This function is useful for ensuring that these devices do not overload a network, or to ensure that storage space is not exceeded in the event that the output of a device is being recorded. This mechanism keeps track of the number of bytes which have been sent by the device over some past period of time. In addition, the mechanism has user-definable parameters that indicate the maximum amount of data which can be sent over a given interval of time.

The rate limiter looks at the device's history of data transmission and projects forward in time and determines whether the data rate needs to be reduced. The rate limiter calculates a nominal rate and uses that rate to determine if packets should be discarded to slow down the output rate. For example, if the device's parameters are set so that it is not to generate more than 50 MB per hour, the nominal rate over that hour is about 7 Mbps. In the beginning, there is plenty of budget, so no attempt is made to limit the rate and bursts of traffic greater than the nominal rate are allowed. However, the rate limiting mechanism keeps track of what has been sent and, as time goes on, if the amount of data sent exceeds the nominal rate, the rate limiter will instruct the gating mechanism to suppress packets until the nominal rate is achieved. After a prolonged burst of traffic above the nominal level, the rate limiter will cause packets to be dropped in a dithering-like fashion (i.e., with an irregular duty-cycle) so that the effective data rate will remain at or below the nominal level.

Instances of this invention can be connected with off-the-shelf computer networking hardware to create digital versions of the traditional analog closed circuit television systems. In addition, these devices can coexist with computer systems on a (TCP/IP-based) local area network (such as Ethernet), or on the Internet. This invention is a fully-functional, first-class, network citizen. In its Internet implementation, it responds to "ping" messages, it handles ICMP redirects, it performs address resolution with ARP and RARP protocols, it can send and receive IP and UDP packets of any variety, and it can do transfers between files on a remote host and its local memory by way of the TFTP protocol. Most significantly however, this invention can send and receive digital audio and compressed digital video using the Internet standard RTP and RTCP protocols, as well as being able to use IP multicast protocols.

The use of multicast RTP-encapsulated motion JPEG (MJPEG) and audio was popularized on the MBONE—the experimental Multicast Backbone of the Internet. A number of applications have been written for a wide variety of personal computers and workstations that work with this combination of data formats and protocols, and this invention interoperates with all of them. For example, the invention can be used to send data to the popular "vic" and "vat" video teleconferencing software, as well as the ShowMeTV product from Sun.

While the RTP/RTCP protocols have been specified to work with other forms of video coding, such as MPEG, Motion JPEG is used for most applications. While MPEG can provide higher compression ratios than motion JPEG, it can suffer when run on a computer communications network with the possibility of congestion-based packet loss. MPEG is not well suited for use with unreliable or datagram-based protocols. This is because the loss of a single packet of an MPEG stream could result in the loss of an entire Group of Pictures (GOP), which could be tens of frames of video. With MJPEG, it is possible to lose a packet (and perform very simple error concealment) and not lose the frame of video. Another benefit of the use of MJPEG over MPEG is that MJPEG encoding is significantly simpler and cheaper than MPEG encoding. This allows the invention to operate at full video frame capture rate and still be a small, low-cost, and low-power device.

The modular construction of the preferred embodiment of this invention makes it possible to replace any of the major components with a minimal amount of effort. This makes it possible to easily exchange the Motion JPEG compression unit with an MPEG compression board should it be so desired. It is also possible to swap out the network interface board and have the device work with any number of different network types, as opposed to just Ethernet—e.g., Token Ring, ATM, etc. Likewise, the processor module can be replaced with a different type of CPU. The construction of the firmware is similarly modular in that there is very little effort involved in changing the specific implementation of any of the major components.

In order for this invention to be a simple, self-contained, stand-alone appliance, yet be able to function in a fully general Internet environment, it is required that all of the necessary settings and parameter changes be remotely controllable across the network. Instead of requiring that the device be connected to a desktop computer, have a local control panel and display, use hardwired values, or have a series of switches and jumpers in order to define the network configuration parameters and choose among the various audio and video parameter settings, the invention allows all of the internal settings to be read and written over the network. In addition, all administration and update functions are available over the network as well.

An initial set of configuration values are placed in the CPU board's flash memory when the system is first installed, and then all subsequent changes to the configuration values of the unit can be done over the Internet. This includes such things as changes to the network addressing information, choosing different settings for the various audio/video parameters in the application, and updating the firmware which executes within the unit. For true unattended remote operation, in addition to all this, the unit must be able to automatically detect and recover from failures. This invention does this with a watchdog timer which must be successfully reset periodically or the system will restart itself. Also, the invention automatically resets and restarts itself following any power failure or other exception condition.

An additional function provided by this invention is support for hard cryptography in the form of a Type00 ISO 7816 smartcard. This mechanism simplifies the key distribution problem by providing a means of incorporating a private key along with hardware support for cryptographic algorithms, all in a small, inexpensive, tamper-resistant package. By having a securely stored private key on each device, this invention can perform a variety of different types of public key cryptography transactions. The smartcard provides all of the mechanisms required to provide cryptographically secure means of ensuring that only authorized users can alter the configuration of one of the network multimedia appliances, as well as being able to perform block ciphers on the media streams themselves. The ISO smartcard support on this invention is similar to that of the SIM on GSM cell phones, however this invention uses the smartcard device to provide a higher level of security function than is provided within cell phones.

This invention is useful for any kind of audio/video distribution application, such as remote monitoring, teleconferencing, physical security, telepresence, closed-circuit television, and others. The invention takes the place of a personal computer or workstation with add-in audio/video codecs and network interface, plus operating system, network, and audio/video application software.

Figure 6:
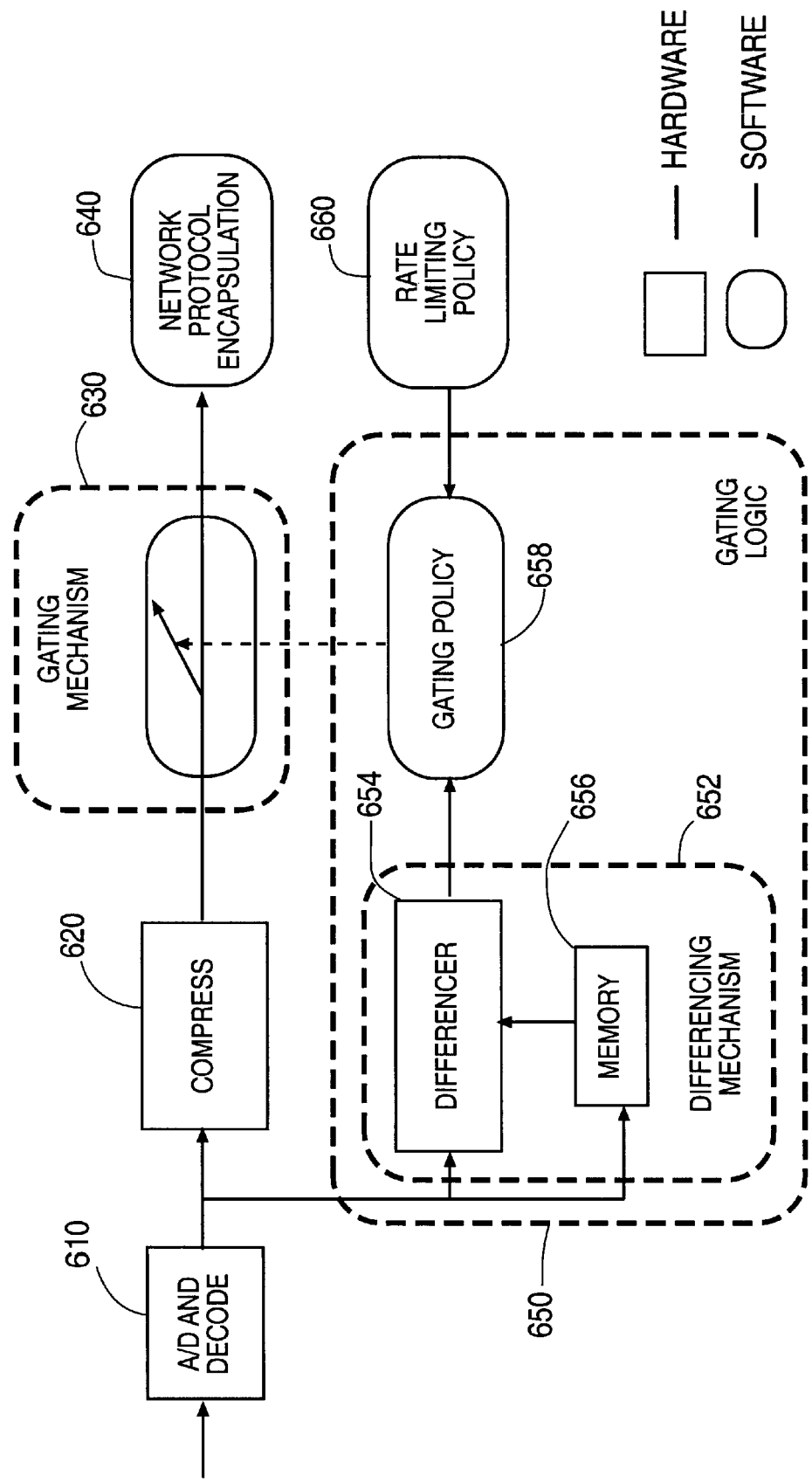
FIG. 6 illustrates the gated compression mechanism of the present invention.

The diagram in FIG. 6 provides a high-level, schematic view of the gated compression mechanism included in this invention. Incoming video is digitized via A/D & Decode block 610 and compressed via compressor 620. In parallel, the digitized data stream is fed to the gating logic 650, where the differencing mechanism 652 calculates the difference 654 between the incoming video stream and the stored reference frame 656. At the end of each incoming frame, the gating policy software 658 reads the cumulative difference information and decides whether the most recently compressed frame should be transmitted or snubbed.

If the gating policy 658 determines that the incoming frame is sufficiently different from the reference frame to be transmitted, the frame is passed to the networking code 640 where it is encapsulated and sent over the network. In addition to all of this, there can be a rate limiting unit 660 which monitors the effective data rate being generated by the device and signals the gating policy 658 to inhibit the production of another frame when the effective rate limit has been exceeded, even if the gating policy would have allowed a frame to be produced.

Figure 7:
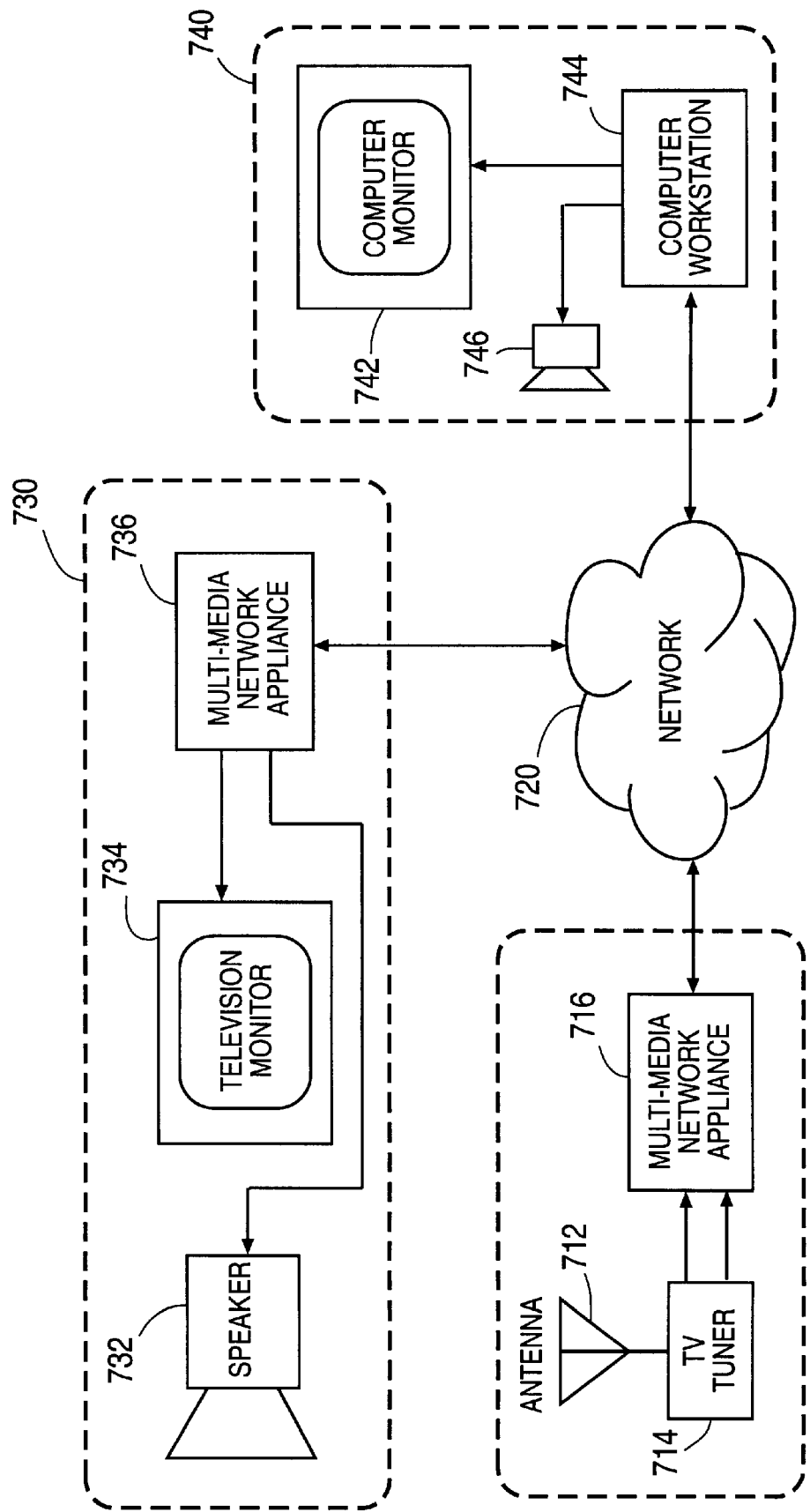
FIG. 7 illustrates an example application of the multi-media network appliance.

In FIG. 7, an example is shown where this invention is used to create a computer-network-based closed-circuit television system. In this example application, an audio/video source unit 710 produces audio/video data for the consumption of an arbitrary number of listeners. The source unit 710 begins by taking video signals off an antenna 712, then selecting and converting (from RF to baseband) a television program by way of a TV tuner 714.

The baseband audio and video signals from the TV tuner 715 are sent to an instance of the invention 716 (in the input configuration) which is connected to a computer communications network 720. Because the digitized audio and video streams are being multicast by the source unit 710, any number of receivers can be connected to the network 720 and receive the transmitted audio/video information simultaneously.

In this example, two different types of receivers are shown. The first is another instance of the invention 736, configured in the output mode, and attached to a television display 734 and speaker 732. The other receiving unit 740 uses a computer workstation 744, with its attached display 742 and speaker units 746 to receive, decompress, and display the transmitted audio/video signals.

Thus, a method and apparatus for providing a multi-media network interface has been described.

What is claimed is:

1. A system for sending media data to and receiving media data from a network comprising:
    an interface unit comprising:
        a network interface for connecting to, and communicating with, a network;
        one or more configuration parameters for controlling said system, said configuration parameters remotely determined and received from said network;
        a media interface for receiving media data;
        a video rate limiter configured to determine a projected rate of output of said interface unit and suppress output packets of said interface unit when said projected rate is greater than a nominal rate; and
        converting means for converting said media data into a form for multicasting on said network through said network interface.

2. The system of claim 1 wherein said media interface is configured to output media data.

3. The system of claim 1 wherein said media interface is configured to input and output media data.

4. The system of claim 1 wherein said media data consists of video data.

5. The system of claim 1 wherein said media data consists of audio data.

6. The system of claim 1 wherein said media data consists of video and audio data.

7. The system of claim 1 wherein said network comprises the internet.

8. The system of claim 1 wherein said network interface comprises an ethernet interface.

9. The system of claim 1 wherein said media interface further comprises a video differencer, said video differencer for determining when a threshold difference between successive video frames has occurred.

10. The system of claim 9 wherein no video data is transmitted when said threshold difference has not occurred.

11. The system of claim 9 wherein video data is transmitted when said threshold difference has occurred.

12. A modular apparatus for transmitting media data between analog media devices and a network, comprising:
    a plurality of modules coupled to a bus, said modules being individually replaceable to support different media formats and network types, said modules comprising:
        a media interface configured to couple to one or more analog devices, said media interface comprising:
            a video input module comprising a video compression unit supporting a video compression format;
            a video output module comprising a video decompression unit supporting a video decompression format;
            an audio module comprising an audio codec supporting an audio format;
        a video rate limiter configured to determine a projected rate of output of said interface unit and suppress output packets of said interface unit when said projected rate is greater than a nominal rate;
        a network interface module configured to couple to a network, said network interface module supporting communications over a first network type;
        a processing module coupled to said bus, said processing module comprising a processor configured to convert media data between one or more media data formats utilized by said media interface and an RTP packet format utilized by said network interface module; and one or more configuration parameters for controlling said system, said configuration parameters remotely determined and received from said network, said configuration parameters associated with said processing module, said media interface and said network interface.

13. The apparatus of claim 12, further comprising a timer configured to be periodically reset remotely via said network during normal operation, wherein said apparatus is configured to restart when said timer expires.

14. The apparatus of claim 12, wherein said packet format comprises an IP multicast protocol.

15. The apparatus of claim 12, wherein said apparatus is configured to provide at least one of encryption and decryption of media data packets transmitted over said network.

16. A method for transmitting media data between media devices and a network, comprising:

transmitting media data between one or more analog media devices and a processing unit via a media interface;

determining a projected rate of output of said interface unit;

suppressing output packets of said interface unit when said projected rate is greater than a nominal rate;

transmitting packetized media data between a network and said processing unit via a network interface;

with said processing unit, converting media data between a media data format utilized by said media interface and a RTP packet format utilized by said network interface;

determining one or more configuration parameters remotely; and receiving said one or more configuration parameters from said network, said one or more parameters associated with said processing unit, said media interface and said network interface.

17. The method of claim 16, further comprising:

determining a difference between a video frame received via said media interface and a reference frame;

based on said difference, determining whether said video frame is to be transmitted in accordance with a gating policy; and suppressing transmission of one or more video frames to meet a predetermined network transmission rate limit.

* * * * *